June 11, 1963    G. J. BLOCKLEY ETAL    3,093,565
NUCLEAR REACTORS

Filed Oct. 3, 1958    2 Sheets-Sheet 1

FIG. I.

Inventors:
Gwillym John Blockley and
George Oliver Jackson

By Larson and Taylor
Attorneys

June 11, 1963   G. J. BLOCKLEY ETAL   3,093,565
NUCLEAR REACTORS
Filed Oct. 3, 1958   2 Sheets-Sheet 2

Inventors:
Gwillym John Blockley and
George Oliver Jackson

United States Patent Office 3,093,565
Patented June 11, 1963

3,093,565
NUCLEAR REACTORS
Gwillym John Blockley, Culcheth, Warrington, and George Oliver Jackson, Lowton, England, assignors to the United Kingdom Atomic Energy Authority, London, England
Filed Oct. 3, 1958, Ser. No. 765,210
Claims priority, application Great Britain Oct. 4, 1957
3 Claims. (Cl. 204—193.2)

This invention relates to gas cooled liquid moderated nuclear reactors and in particular to such reactors employing re-entrant type cooling, that is reactors in which the fuel elements are contained within open ended fuel element tubes located co-axially within thimble ended core tubes and the coolant flow path is through the annual space defined between the thimble ended core tubes and the corresponding fuel element tubes and thence through the fuel element tubes over the fuel elements contained therein. Conventionally in such reactors the liquid moderator is contained within a cylindrical moderator tank and the thimble ended core tubes are welded in passage through one end of the tank.

However in highly rated liquid moderated nuclear reactors requiring a large flow of coolant gas it is found that the space available for performing operations to seal the thimble ended tubes in passage through the end of the moderator tank and for making separate gas connection to the thimble ended core tubes outside the moderator tank is inadequate if the core tubes are to have an optimum spacing to satisfy nuclear requirements and if the diameter of the core tubes is made sufficient to ensure that the pressure drop of coolant through the tubes is kept below a reasonable minimum.

According to the invention a liquid moderated gas cooled nuclear reactor employing re-entrant type cooling has two groups of thimble-ended core tubes entering a moderator containment tank, the tubes of one group entering the moderator containment tank in one direction and intermeshing with the tubes of the second group which enter the moderator containment tank in the opposite direction.

Figure 1:
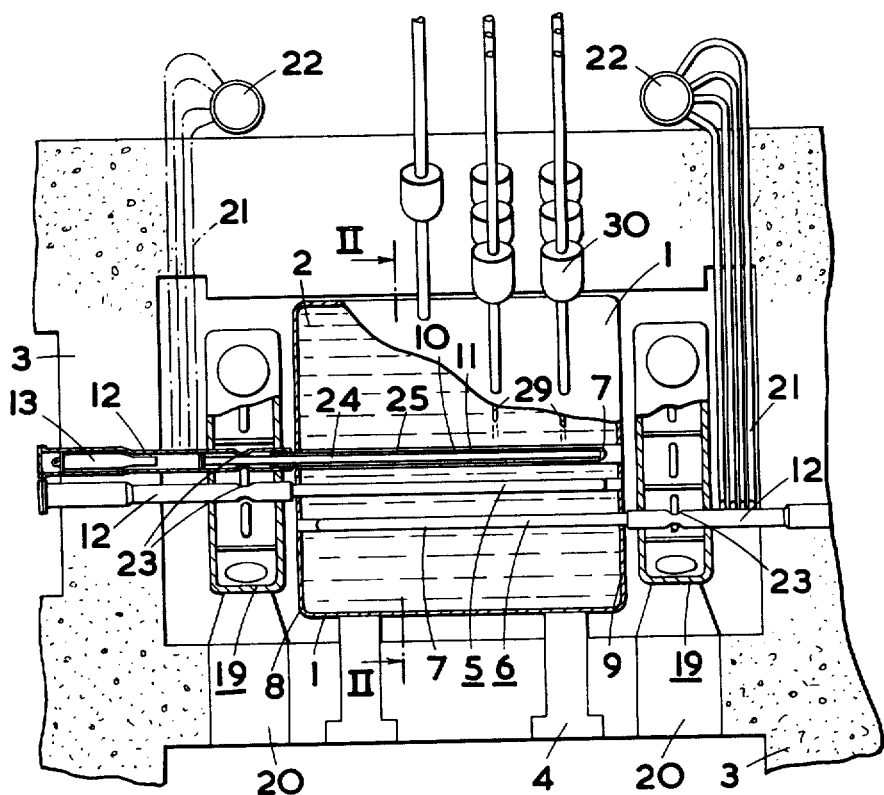
Figure 2:
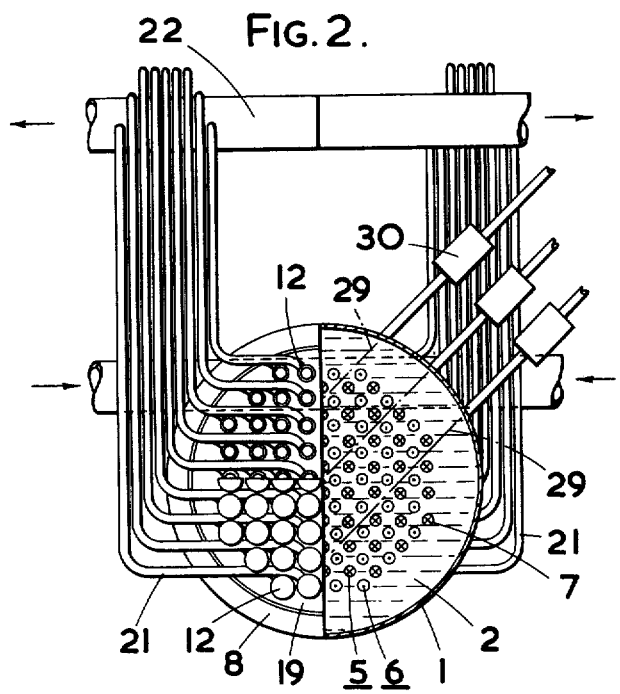
Figure 3:
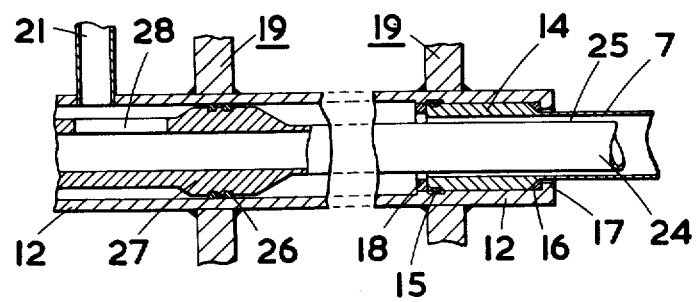

One embodiment of the invention will now be described by way of example with reference to the accompanying semischematic drawings in which:

FIG. 1 is a longitudinal sectional elevation.
FIG. 2 is an end elevation shown partly in section along the line II—II in FIG. 2.
FIG. 3 is a detail of part of FIG. 1 to a larger scale.

Referring to FIGS. 1 and 2 which show a heavy water moderated gas cooled nuclear reactor comprising a cylindrical aluminium tank 1 filled with heavy water 2 serving as a moderator. The tank 1 is supported within a concrete biological radiation shield 3 on flanges 4. Two groups 5 and 6 of thimble ended core tubes 7 enter the tank 1 in opposite directions, through opposite end faces 8 and 9 thereof and are surrounded in the tank 1 by structural tubes 10 (FIG. 1), extending between the end faces 8 and 9. The structural tubes 10 occupy positions at the points of intersection of a closely pitched square lattice. Half the total number of core tubes 7 (i.e. those in the group 5) enter the tank 1 through the end face 8 and the other half (i.e. those in the group 6) enter through the end face 9. As shown in FIG. 2 the tubes 7 marked with a cross represent those of group 5 entering the tank 1 through the end face 8 and those marked with a point represent the tubes 7 of group 6 entering the tank 1 through the end face 9. It is seen that if the spacing of the lattice formed in the tank 1 by the intermeshing of the groups of tubes 5 and 6 is taken to be L the lattice spacing of the tubes 7 in either of the two groups 5 and 6 taken separately is $L\sqrt{2}$ thus providing greater accessibility without affecting the optimum lattice spacing.

The internal diameter of the structural tubes 10 is slightly larger than the external diameter of the core tubes 7 thus providing a heat insulating, pressure relieving and leak detecting space 11 between the tubes 7 and 10. Fuel charge tubes 12 passing through the radiation shield 3 are normally blocked by steel encased concrete shield plugs 13. The core tubes 7 are sealed in connection with the charge tubes 12 as shown in FIG. 3. Each core tube 7 has a thickened end section 14 at which sealing is made between the core tube 7 and the corresponding charge tube 12 by a piston ring 15 and a metal sealing ring 16. The metal sealing ring 16 is located between the end section 14 of the core tube 7 and an internal flange 17 in the charge tube 12. The seal is maintained by the loading of a threaded clamping ring 18 screwed inside the charge tube 12.

Referring again to FIGS. 1 and 2 the charge tubes 12 pass through cylindrical gas inlet manifolds 19 supported adjacent to the end faces 8 and 9 of the tank 1 on pillars 20. Individual gas outlet pipes 21 connect with each of the charge tubes 12 external to the manifolds 19 and lead through the radiation shield 3 to outlet manifold pipes 22. Gas inlet ports 23 are provided in the charge tubes 12 internal to the inlet manifolds 19. Fuel element tubes 24 sealed at one end within the charge tubes 12 pass coaxially through the core tubes 7 and are of smaller external diameter than the internal diameter of the core tubes 7 thus defining an annular space 25 between the tubes 7 and 24. Referring again to FIG. 3 each fuel element tube 24 is sealed in the corresponding charge tube 12 by piston rings 26 fitted to a thickened end section 27 of the tube 24. The fuel element tubes 24 have gas outlet ports 28 adjacent to the points of connection of the gas outlet pipes 21 with the charge tubes 12. In operation of the reactor coolant gas is passed from the inlet manifolds 19 through the inlet ports 23 into the annular spaces 25 between the core tubes 7 and the fuel element tubes 24. The coolant gas then passes back through the fuel element tubes 24 over fuel elements (not shown) contained therein and thence from the charge tubes 12 through the individual gas outlet pipes 21 to the outlet manifold pipes 22. The reactor is controlled by reciprocating movement of boron steel control rods 29 (represented in FIG. 2 by chain dotted lines) which enter the tank 1 transversely and are moved by control rod operating mechanisms 30.

In the form of reactor described above the space available for making individual gas connection with the core tubes 7 outside the tank 1 is greater than that available when all the core tubes 7 are entered into the tank 1 from one face as is done conventionally.

We claim:
1. A liquid moderated gas cooled nuclear reactor employing re-entrant type cooling and having two groups of thimble ended core tubes entering a moderator con- tainment tank, the tubes of one group entering the moderator containment tank in one direction and intermeshing with the tubes of the second group which enter the moderator containment tank in the opposite direction.

2. A liquid moderated gas cooled nuclear reactor as claimed in claim 1 wherein the thimble ended core tubes are arranged on symmetrical lattices in the two groups and the two groups of core tubes intermesh in the moderator containment tank to form a total symmetrical lattice of tubes.

3. A liquid moderated gas cooled nuclear reactor as claimed in claim 2 wherein the thimble ended core tubes are arranged in the two groups on square lattices of pitch $L\sqrt{2}$ and together form a total square lattice of pitch L within the moderator containment tank.

References Cited in the file of this patent

UNITED STATES PATENTS

| | | |
|---|---|---|
| 2,741,593 | Metcalf, et al. | Apr. 10, 1956 |
| 2,744,064 | Moore | May 1, 1956 |

OTHER REFERENCES

Nucleonics, vol. 15, No. 11, November 1957, pp. 165–169.